United States Patent [19]

Pokorny

[11] 4,455,348

[45] Jun. 19, 1984

[54] WIRE COATING COMPOSITION

[75] Inventor: Richard J. Pokorny, Woodbury, Minn.

[73] Assignee: Minnesota Mining and Manufacturing Company, St. Paul, Minn.

[21] Appl. No.: 517,768

[22] Filed: Jul. 27, 1983

Related U.S. Application Data

[62] Division of Ser. No. 283,292, Jul. 14, 1981, Pat. No. 4,414,355.

[51] Int. Cl.$^3$ .............................................. D02G 3/00
[52] U.S. Cl. .................... 428/377; 428/379; 428/412; 428/461; 428/511; 428/512; 428/516
[58] Field of Search ................ 428/500, 412, 457, 37, 428/537, 461, 512, 511, 516, 379

[56] References Cited

U.S. PATENT DOCUMENTS

| | | | |
|---|---|---|---|
| 3,398,182 | 8/1968 | Guenthner et al. | 260/455 |
| 3,896,251 | 7/1975 | Landucci | 428/290 |
| 4,192,930 | 11/1980 | Beck et al. | 525/227 |
| 4,215,205 | 7/1980 | Landucci | 525/331 |
| 4,237,037 | 12/1980 | Takahashi | 260/28.5 |
| 4,329,272 | 5/1982 | Dufour | 524/288 |

FOREIGN PATENT DOCUMENTS 53-78038 11/1978 Japan.

OTHER PUBLICATIONS

Shea, Jack W., "Treatment of Degraded PIC Insulation in Pedestal Closures Associated with Buried Plant".

*Primary Examiner*—George F. Lesmes
*Assistant Examiner*—E. Rollins Buffalow
*Attorney, Agent, or Firm*—Donald M. Sell; James A. Smith; Lorraine R. Sherman

[57] ABSTRACT

An insulative coating composition for providing water-repellancy to and protecting communication wire comprises an admixture of an anhydride copolymer, a flexibilizing copolymer, a suitable solvent system, a hydrophobic, soluble, compatible fluoroaliphatic radical-containing composition and optionally, a mercaptan, and optionally, an antioxidant. Articles coated with the insulative composition are disclosed.

8 Claims, No Drawings

WIRE COATING COMPOSITION

This is a division of application Ser. No. 283,292 filed July 14, 1981 now U.S. Pat. No. 4,414,355.

TECHNICAL FIELD

This invention relates to a coating composition for rendering water-repellant and protecting electrical wire, and especially, communication wire. In another aspect, it relates to a process for waterproofing and protecting electrical wire. In a further aspect, it relates to articles coated with the air dried insulative coating of the present invention.

BACKGROUND ART

Paper and polyethylene insulated electrical wire may suffer from degradation of its protective covering. This degradation can result in failure of the electrical properties of the wire or cause it to short out. A further problem exists with spiral wrapped paper insulation. Splicing and other handling of the wire tends to result in exposure of the copper core. Particularly, such handling can cause unravelling of the spiral wrapped paper insulation. To overcome this problem without expensive rewiring, field applied spray insulation has been developed. An aliphatic polyurethane system useful as a field-applied spray insulation (i.e., B-Insulation Spray, Sprayon Products Div. of Sherwin-Williams Co.) was disclosed by J. W. Shea at the Proceedings of the 21st International Wire and Cable Symposium, Cherry Hill, NJ, "Treatment of Degraded PIC Insulation in Pedestal Closures Associated with Buried Plant," pp. 70-74, 1971. This system has utility for polyethylene insulated wires, but has not been found to be useful on paper.

Ethylene resins useful as coating compositions are known. For example, U.S. Pat. No. 4,237,037 discloses a hot melt powder composition for coating metallic substrates comprising an ethylene resin mixture composed of an ethylene copolymer and a graft copolymer of polyethylene and a hydrocarbon wax.

A moldable thermoplastic composition containing a minor amount of an esterified olefin-maleic anhydride copolymer is disclosed in U.S. Pat. No. 4,192,930.

Japanese Patent application No. 78-038 (1980) (Derwent Abstract available) teaches olefinic polymers and copolymers with cyclo-olefin and maleic anhydride for bonding to metals when the polymeric composition is in the molten state.

It is novel in the art to provide a sprayable field-applied insulation which is a solvent-containing mixture comprising an anhydride copolymer, a flexibilizing polymer, and a fluorochemical compound, the mixture being inexpensive, easily applied, having good electrical characteristics, drying rapidly, resisting moisture, thermally stable at pedestal temperatures, non-flammable, having good clarity so color coding is not affected, and having no effect on connectors and other hardware normally used in wire splicing and terminating, and useful for pulp, polyethylene, and paper insulated wires.

DISCLOSURE OF THE INVENTION

Briefly, the present invention provides an insulating composition to maintain the integrity of new paper insulated wire and a restorative composition for wire on which paper or polyethylene insulation has degraded or unraveled, the composition comprising an admixture of an anhydride copolymer, a flexibilizing copolymer, a hydrophobic, soluble, compatible fluoroaliphatic radical-containing composition and optionally, a mercaptan, and optionally, an antioxidant, a suitable solvent system, and articles made therefrom.

The invention provides a composition having adhesive properties towards paper, polyethylene, polycarbonate, and metal, particularly copper, dissolved in a nonflammable mixture of organic solvents. It is compatible with polycarbonate connectors known to stress-crack due to polycarbonate solubility in many solvents. Since insulation restorative compositions are frequently used in enclosed areas such as indoors and in manholes, and on live wires, the liquid composition is non-flammable. It penetrates and is absorbed into the wire insulation surface, and upon drying, bonds paper to itself, and tightly seals cracks in polyethylene. It re-establishes a thin layer of insulation where the paper insulation has degraded or the polyethylene has cracked. The dried composition acts as an insulative overcoat on exposed copper wires or connections. The dried coating composition has good clarity, so wire color coding will not be affected.

Related compositions useful as contact enhancing materials are disclosed in commonly assigned copending patent application, Ser. No. 379,340 now U.S. Pat. No. 4,415,694 filed the same date as this application.

DETAILED DESCRIPTION

The dried wire coating composition of the present invention comprises an admixture of:
35 to 70 weight percent of an anhydride copolymer,
10 to 41 weight percent of a flexibilizing polymer,
10 to 40 weight percent of a fluoroaliphatic radical-containing composition,
up to 10 weight percent of a mercaptan compound, and
up to 5 percent by weight and preferably 2 percent by weight, of an antioxidant composition.

This composition is dissolved at a level of 4 to 12 percent by weight of the total solution, preferably 6 to 9 percent by weight, dissolved in a solvent system comprising 88 to 96 percent by weight of the total solution, the solvent system being a mixture of $C_6$ to $C_9$ aliphatic hydrocarbons, lower molecular weight alcohols (i.e., $C_1$ to $C_4$), and trichlorotrifluoroethane. To provide a non-flammable solvent mixture the level of trichlorotrifluoroethane should be from 75 to 95 percent by weight of the solvents and preferably 80 to 90 percent. The aliphatic hydrocarbons comprise 10 to 25 percent by weight of the solvent mixture and the alcohols comprise 0.5 to 15 percent by weight of the solvent mixture.

The major component of the composition is an anhydride copolymer, the anhydride being an alkyl or aryl substituted or unsubstituted cyclic anhydride wherein the alkyl groups contain up to 6 carbon atoms each and the cyclic group can contain 4 to 15 carbon atoms, such as maleic or itaconic anhydride, and preferably it is maleic anhydride, i.e., 35-70 weight percent, and preferably 45-60 weight percent of maleic anhydride copolymerized with $C_{10}$ to $C_{24}$ aliphatic hydrocarbons to produce polymers such as maleic anhydride octadecene copolymer (PA-18, Gulf Oil Chemicals Co.), maleic anhydride decene copolymer (PA-10, Gulf Oil Chemicals Co.), and maleic anhydride tetradecene copolymer (PA-14, Gulf Oil Chemicals Co.). The anhydride copolymer provides good adhesion to a number of substrates, for example, polyethylene, polycarbonate, and metals, such as copper, and some adhesion to paper.

Due to the brittle nature of the anhydride copolymer as well as its susceptibility to hydrolysis in the presence of water, which can lead to reduced insulation resistance and corrosion of copper wire, and due to its insufficient adhesion to paper, a flexibilizing polymer such as polyisobutylene or ethylene copolymerized with vinyl acetate, acrylate esters, methacrylate esters, or alpha-olefins is added. The flexibilizing polymer is a rubbery, compatible, adherent material that helps provide a thick, flexible coating. Preferably it is soluble in the solvent system. Preferably, it is an ethylene vinyl acetate copolymer, for example ethylene vinylacetate copolymer with 33% vinyl acetate (Elvax 150®, E. I. Dupont de Nemours Corp.), or ethylene vinylacetate copolymers with 28% vinyl acetate (Elvax 240® or Elvax 250®, E. I. Dupont de Nemours Corp.), or butyl rubber (Exxon Butyl 165®, Exxon Chemical Co.). An amount of flexibilizing polymer in the range of 10 to 41 weight percent and, preferably 20 to 30 weight percent, can be used.

By "compatible" as used herein is meant a clear to slightly translucent non-separating polymer mixture.

The composition of the present invention also includes 10 to 40 percent, preferably 15 to 25 percent by weight of the dried composition of a hydrophobic, soluble, compatible fluoroaliphatic radical-containing composition, i.e., compounds or polymers or mixtures, to provide hydrophobicity to the mixture so as to result in a water-repellant product. By fluoroaliphatic radical is meant a monovalent, fluorinated aliphatic, preferably saturated, organic radical having an average of at least 5 to 14 carbon atoms. The skeletal chain of the radical can be straight, branched, or, if sufficiently large, cyclic, and can include divalent oxygen atoms or trivalent nitrogen atoms bonded only to carbon atoms. Preferably, it is fully fluorinated, but hydrogen or chlorine atoms can be present as substituents on the skeletal chain, provided that not more than one atom of either hydrogen or chlorine is present for every two carbon atoms in the skeletal chain, and the radical contains at least a terminal perfluoromethyl group. Preferably, the radical has about 6 to 10 carbon atoms. The fluoroaliphatic radical-containing compositions of this invention can contain radicals which are the same as, or different from, one another. The fluoroaliphatic radical-containing compositions include vinyl polymers such as those disclosed in U.S. Pat. No. 3,896,251. Particularly useful are acrylate polymers with urethane-containing side chains, blends of fluoroaliphatic radicals containing acrylate polymers and fluorocarbon compounds or adducts such as described in U.S. Pat. No. 4,215,205. Compounds which are adducts of fluoroaliphatic radical containing alcohols and organic isocyanates such as the urethane adduct of two moles of N-ethylperfluoroalkylsulfonamidoethanol and one mole toluene diisocyanate, hereinafter referred to as Compound I, available from 3M, are described in U.S. Pat. No. 3,398,182. A particularly useful polymer is 57:28:15 N-methylperfluorooctylsulfonamidoethyl methacrylate : N-ethylperfluorooctylsulfonamidoethyl alcohol [toluene-2,4-diisocyanate] hydroxypropyl methacrylate : butyl acrylate disclosed in U.S. Pat. No. 4,171,397 (Compound II, 3M), and a polymer adduct mixture (Compound III, 3M) containing 90 parts by weight of
35 parts by weight of methyl N-methylperfluorooctylsulfonamidoethylacrylate
35 parts by weight of butyl N-methylperfluorooctylsulfonamidomethacrylate
20 parts by weight of dimethacrylate of 2000 molecular weight tetramethylene oxide diol (Polymeg 2000®, Quaker Oats Co.)
10 parts by weight of butyl acrylate
and 10 parts by weight of N-ethylperfluorooctylsulfonamido ethanol toluene diisocyanate adduct which has been converted to carbodiimide.

Other useful fluoroaliphatic vinyl containing polymers are described in U.S. Pat. Nos. 2,803,615, 3,462,296, 3,950,298, 3,574,791 (ex. 17), and 3,787,351.

A mercaptan, present in the range of up to 10 percent, and preferably 1 to 5 percent, of the total composition by weight, is included in the composition to inhibit corrosion of copper. Suitable are soluble, compatible silane mercaptans, such as an omega-trialkoxysilylalkylmercaptan wherein the alkoxy group contains up to 3 carbon atoms ($C_1$ is preferred) and the alkyl group contains 2 to 8 carbon atoms, an example being gamma-mercaptopropyltrimethoxysilane (A-189, Union Carbide), or an alkyl or alkoxy mercaptan of $C_4$ to $C_{24}$ such as octadecene mercaptan. The presence of the mercaptan, by binding the copper, also increases the insulation resistance of the coating.

Suitable antioxidants include phenols, phosphites (for example tris(nonyl phenyl)phosphite), thioesters, and amines (for example phenyl beta naphthalene). Preferred is a hindered phenol, such as tetrakis[methylene 3-(3′, 5′-di-tert-butyl-4′-hydroxyphenyl) propionate]methane (Irganox 1010®, Ciba-Geigy Corp.), thiodiethylene bis-(3,5-di-tert-butyl-4-hydroxy)hydrocinnamate (Irganox 1035®, Ciba-Geigy Corp.), or octadecyl-3-(3′,5′-di-tert-butyl-4′-hydroxyphenyl)propionate (Irganox 1076®, Ciba-Geigy Corp.), a copper ion scavenger and antioxidant such as MD1024 (Ciba-Geigy Corp.), or a compound such as distearyl thiodipropionate (Cyanox STDP®, American Cyanamid Polymer and Chem. Dept.). An antioxidant is included in the formulation to prevent oxidation of the coated composition.

For ease of application, the insulation composition is in solution form. Since polycarbonate connectors are widely used in the communication field, and since polycarbonate is susceptible to stress-cracking and crazing in certain solvents, solvents useful in the present invention must provide solubility to the anhydride and flexibilizing polymers, but not to polycarbonate. A mixture of $C_6$ to $C_9$ aliphatic hydrocarbons such as heptane or hexane, lower molecular weight $C_1$ to $C_4$ alcohols such as isopropyl alcohol, and trichlorotrifluoroethane (Freon TF®, E. I. Dupont de Nemours Corp.) provide the desired solubility for the components of the mixture and not to polycarbonate, as well as providing a suitable drying rate after application.

Freon TF, present in the range of 75 to 95% by weight of the solvent mixture, provides a non-flammable insulation composition, this property being desirable due to the frequent use of insulation restorative compositions in enclosed areas, such as indoors or in manholes, and also on live wires.

The insulation composition of the present invention may be sprayed, dipped, or brushed onto metal, paper, polyethylene, and polycarbonate to a thickness of about 25 to 50 microns. Since it can be field-applied, preferably it dries tack-free at ambient conditions in 10 to 40 minutes. The evaporation rate, desirably, is slow enough so as not to clog the spray head, and fast enough so as to result in a reasonably rapid drying speed for the applied composition.

The wire coating composition is useful to form a smooth coated film on bare wire or on degraded paper or polyethylene insulated wire in the field. It is also useful in maintaining the integrity of spiral wrapped paper wires.

Objects and advantages of this invention are further illustrated by the following examples, but the particular materials and amounts thereof recited in these examples, as well as other conditions and details, should not be construed to unduly limit this invention.

EXAMPLES 1-21

The following procedure was used in preparing the samples of Examples 1-19, the compositions of which are described in TABLE I. In a suitable vessel the indicated amounts of antioxidant, flexibilizing polymer, aliphatic hydrocarbon, and alcohol were heated and stirred to 55° C. When the flexibilizing polymer was dissolved, the maleic anhydride copolymer was added. This was stirred until it was dissolved. Then the temperature of the mixture was adjusted to 35° C. and Freon TF was added. The temperature was maintained at 35° C. and the mixture was stirred for 10 minutes. Next, the fluorochemical was added and mixed for 30 minutes at 35° C. The solutions were allowed to cool for 24 hours and then adhesion testing was done.

Adhesion to copper and polyethylene was measured by a tape test, ASTM D3359-74, Method B, Cross Cut Tape Test, using 110 copper alloy as well as 0.92 density polyethylene (DFD 6005 Natural from Union Carbide Corp.) for substrates. Scotchbrand 710® tape (3M) was used. The average result of four samples was recorded. For the paper adhesion test, spiral wrapped, paper insulated 20 AWG aluminum telephone wire (Olex, Australia) was used. This wire was sprayed with the solution being tested and allowed to dry overnight. The wire was then wrapped around a 2.7 mm diameter rod and the number of turns without opens (places where the paper separated from itself) were counted. This was repeated four times and the result was recorded as the percentage of turns without opens.

TABLE I gives the wire coating compsitions of Examples 1-21.

TABLE I

| Ex. No. | ELV (%)[d] | Heptane | propyl Alc | AHC (%)[e] | Freon TF | FC (%)[a] | SA (%)[g] | FP(%)[f] | EEA (%)[b] | IRG (%)[c] |
|---|---|---|---|---|---|---|---|---|---|---|
| 1 | .87 (14)[1] | 8 | 4 | 4.27 (70)[3] | 80.5 | 2.13 (14)[2] | | | | .13 (2) |
| 2 | .67 (12)[1] | 8 | 4 | 3.33 (61)[3] | 80.5 | 3.33 (25)[2] | | | | .13 (2) |
| 3 | .45 (10)[1] | 8 | 4 | 2.27 (49)[3] | 80.5 | 4.53 (39)[2] | | | | .13 (2) |
| 4 | 1.83 (28)[1] | 8 | 4 | 3.67 (58)[3] | 80.5 | 1.83 (12)[2] | | | | .13 (2) |
| 5 | 1.47 (25)[1] | 8 | 4 | 2.93 (52)[3] | 80.5 | 2.93 (21)[2] | | | | .13 (2) |
| 6 | 1.04 (22)[1] | 8 | 4 | 2.09 (43)[3] | 80.5 | 4.13 (33)[2] | | | | .13 (2) |
| 7 | 2.93 (44.5)[1] | 8 | 4 | 2.93 (44.5)[3] | 80.5 | 1.47 (9)[2] | | | | .13 (2) |
| 8 | 2.44 (41)[1] | 8 | 4 | 2.44 (41)[3] | 80.5 | 2.44 (16)[2] | | | | .13 (2) |
| 9 | 1.83 (35)[1] | 8 | 4 | 1.83 (35)[3] | 80.5 | 3.66 (28)[2] | | | | .13 (2) |
| 10 | 1.7 (30)[1] | 8 | 4 | 3.0 (52)[1] | 80.6 | 2.6 (18)[2] | | | | |
| 11 | 1.7 (30)[1] | 8 | 4 | 3.0 (52)[2] | 80.6 | 2.6 (18)[2] | | | | |
| 12 | | 20 | 1 | 3.0 (53)[1] | 71.5 | 3 (21)[2] | | | 1.5 (26) | |
| 13 | | 20 | 1 | 3.0 (53)[3] | 71.5 | 3 (21)[2] | | 1.56 (26)[1] | | |
| 14 | | 20 | 1 | 3.0 (53)[3] | 71.5 | 3 (21)[2] | | 1.56 (26)[2] | | |
| 15 | 1.5 (26)[2] | 20 | 1 | 3.0 (53)[3] | 71.5 | 3 (21)[2] | | | | |
| 16 | 1.5 (26)[3] | 20 | 1 | 3.0 (53)[3] | 71.5 | 3 (21)[2] | | | | |
| 17 | 1.7 (29)[1] | 8 | 4 | 3.0 (50)[3] | 80.6 | 2.6 (18)[2] | 0.1 (1.7) | | | 0.1 (1.7) |
| 18 | 1.7 (30)[1] | 8 | 4 | 3.0 (52)[3] | 80.6 | 2.6 (26)[1] | | | | |
| 19 | 1.7 (30)[1] | 8 | 4 | 3.0 (52)[3] | 80.6 | 1.6 (26)[3] | | | | |
| 20 Control (h) | | | | | | | | | | |
| 21 Control (i) | | | | | | | | | | |

(*)All numbers are in grams, percents are weight percents of dried compositions
(a) FC = Fluorocarbon polymer,
(1) Compound I, above
(2) Compound II, above
(3) Compound III, above
(b) EEA = Ethylene ethyl acrylate, 18% ethyl acrylate DPDA 9169 ® (Union Carbide Corp.)
(c) IRG = Irganox-1010
(d) ELV = Ethylene-vinylacetate copolymer
(1) Elvax 150
(2) Elvax 240
(3) Elvax 250
(e) AHC = anhydride copolymer
(1) PA-10
(2) PA-14
(3) PA-18
(f) FP = flexibilizing polymer
(1) Butyl Rubber (Exxon Buytl 165, Exxon Chemical Co.)
(2) Polyisobutylene (Vistanex L-120, Exxon Chemical Co.)
(g) SA = silane, gamma-mercaptopropyltrimethoxysilane
(h) B-Insulation Spray (Sprayon Products, Div. of the Sherwin-Williams Co.)
(i) 85/15 Ethyl methacrylate/butyl acryalte (Scotch ® Coating 16, 3M)

TABLE II shows the results of copper adhesion, polyethylene adhesion, and spiral paper adhesion tests using the compositions of TABLE I. In the copper and polyethylene adhesions tests, a score of 5 represents perfect adhesion and a score of 0 represents no adhesion. In the spiral paper adhesion test, a non-sprayed control wire gave a result of 50%.

TABLE II

| | Adhesion Data | | |
|---|---|---|---|
| Ex. No. | Copper Adhesion | Polyethylene Adhesion | Spiral Paper Adhesion (%) |
| 1 | 4.0 | 3.0 | 86 |
| 2 | 5.0 | 3.0 | 75 |
| 3 | 4.5 | 4.0 | 75 |

TABLE II-continued

| | Adhesion Data | | |
|---|---|---|---|
| Ex. No. | Copper Adhesion | Polyethylene Adhesion | Spiral Paper Adhesion (%) |
| 4 | 4.0 | 0 | 100 |
| 5 | 4.0 | 2.5 | 93 |
| 6 | 4.0 | 3.5 | 72 |
| 7 | 0 | 0 | 100 |
| 8 | 3.0 | 1.5 | 89 |
| 9 | 4.0 | 1.5 | 82 |
| 10 | 5.0 | 3.5 | 100 |
| 11 | 4.5 | 0.5 | 81 |
| 12 | 4.5 | 3.5 | 80 |
| 13 | 4 | 2.7 | 47 |
| 14 | 3.2 | 2.5 | 64 |
| 15 | 4 | 3.7 | 69 |
| 16 | 3.7 | 3.5 | 61 |
| 17 | 5 | 0.7 | 86 |
| 18 | 4 | 4.5 | 61 |
| 19 | 5 | 1.7 | 86 |
| Control 20 | 0 | 0 | 61 |
| Control 21 | 4.7 | 0 | 64 |

The data of TABLE II show the effect of varying the coating composition. Examples 7, 20, and 21 are outside the present invention. Example 7 has greater than 41% flexibilizing polymer which results in poor copper and polyethylene adhesion. Example 5, within the present invention, provided good adhesion to all three substrates. The silane mercaptan added to Example 17 had improved copper adhesion but interfered with polyethylene adhesion. Control Examples 20 and 21 gave adhesion results to the three substrates that are poorer than compositions within the present invention.

Various modifications and alterations of this invention will become apparent to those skilled in the art without dparting from the scope and spirit of this invention, and it should be understood that this invention is not to be unduly limited to the illustrative embodiments set forth herein.

What I claim is:

1. An article comprising a substrate having a composition coated on at least one surface thereof, said composition comprising an admixture of:
   a. 35 to 70 weight percent of an anhydride copolymer which is the reaction product of:
      (1) an alkyl or aryl substituted or unsubstituted unsaturated cyclic anhydride wherein each alkyl group contains up to 6 C atoms and the cyclic group contains 4 to 15 C atoms, and
      (2) an unsaturated $C_{10}$ to $C_{24}$ aliphatic hydrocarbon;
   b. 10 to 41 weight percent of a compatible, flexibilizing polymer which is selected from polyisobutylene and polymers of ethylene copolymerized with vinyl acetate, acrylate esters, methacrylate esters, and alpha-olefins, and
   c. 10 to 40 weight percent of a hydrophobic, compatible, fluoroaliphatic radical-containing composition, said fluoroaliphatic radical being a monovalent, fluorinated, aliphatic radical having 5 to 14 carbon atoms which can be interrupted by divalent O atoms or trivalent N atoms bonded to C atoms; said fluoroaliphatic radical-containing composition being capable of providing water-repellancy to said admixture, and
   d. up to 10 weight percent of a mercaptan compound.

2. The article according to claim 1 wherein said coating composition further comprises an amount of an antioxidant sufficient to prevent oxidation of said composition.

3. The article according to claim 1 wherein said substrate is paper, polyethylene, polycarbonate, or metal.

4. The article according to claim 1 prepared by providing said substrate with said composition by means of spraying, dipping, or brushing.

5. An article according to claim 1 wherein said article is an electrical wire.

6. An article according to claim 5 wherein said wire is polyethylene insulated.

7. An article according to claim 5 wherein said wire is paper insulated.

8. An article according to claim 7 wherein said paper insulation is spiral-wrapped.

* * * * *